United States Patent [19]

Ueda et al.

[11] Patent Number: 5,310,154

[45] Date of Patent: May 10, 1994

[54] SEAT FRAME-MOUNTING STRUCTURE

[75] Inventors: Katsuya Ueda; Kikuo Sugimura; Isao Morishita, all of Toyota, Japan

[73] Assignee: Toyota Jidosha Kabushiki Kaisha, Toyota, Japan

[21] Appl. No.: 948,495

[22] Filed: Sep. 22, 1992

[30] Foreign Application Priority Data

Oct. 18, 1991 [JP] Japan .................. 3-271334

[51] Int. Cl.⁵ .......................... F16M 13/00
[52] U.S. Cl. .................. 248/394; 248/396; 248/421; 297/452.18
[58] Field of Search ............ 297/452.18; 248/394, 248/395, 396, 421

[56] References Cited

U.S. PATENT DOCUMENTS

| | | | |
|---|---|---|---|
| 3,022,035 | 2/1962 | Pickles | 248/395 |
| 3,149,815 | 9/1964 | Cotter et al. | 248/421 |
| 5,112,018 | 5/1992 | Wahls | 248/394 |
| 5,199,679 | 4/1993 | Nakamura et al. | 248/394 |

FOREIGN PATENT DOCUMENTS

| | | |
|---|---|---|
| 28629 | 1/1990 | Japan . |
| 234321 | 3/1990 | Japan . |
| 234327 | 3/1990 | Japan . |

OTHER PUBLICATIONS

Toyota Crown Series Automobile Repair Handbook vol. 2/2, Issued Sep. 3, 1987, by Toyota, A Split Bench type seat is illustrated, (Especially pp. 12–132).

Primary Examiner—Alexander Grosz
Attorney, Agent, or Firm—Cushman, Darby & Cushman

[57] ABSTRACT

A vehicle seat-mounting structure, of which a cut-out portion is formed at an inner side of a seat frame in the transverse direction of a vehicle and extends from an edge portion of the seat frame behind a vehicle seat. In order that opposite edge portions of the cut-out portion in the transverse direction of the vehicle is fixed indirectly to an adjusting rail, a shaft is rotatably supported to a reclining lower arm so as to secure linking members to both ends of the shaft. Bracket members are rotatably supported to the linking members. The seat frame is secured to the bracket members, and the seat frame is then secured to the adjusting rails.

34 Claims, 4 Drawing Sheets

SEAT FRAME-MOUNTING STRUCTURE

BACKGROUND OF THE INVENTION

1. Field of the Invention

The present invention relates to a seat frame-mounting structure for a split bench type vehicle seat and the like.

2. Background Information

A bench type seat, on which three people can sit, is structured such that the seat cushion and the seat back are continuous from the driver's seat to the front passenger seat. In a split bench type seat, the seat cushion and the seat back of a bench type seat are divided into a driver's seat portion and a front passenger seat portion so that seat back reclining adjustment, seat cushion front-and-back position adjustment and the like can be effected independently for the driver's seat portion and the front passenger seat portion. (See Repair Handbook, Vol. 2/2 for Toyota's Crown series automobiles, issued Sep. 3, 1987 by Toyota Jidosha kabuskiki Kaisha).

As illustrated in FIG. 4 showing a conventional seat frame-mounting structure, each seat portion of a split bench type seat 80 includes: a seat frame 82, which is press-formed from an iron plate and the like; a urethane pad and spring members (both unillustrated), such as a S-shaped springs, the urethane pad and the spring members being mounted to the seat frame 82; and, a covering material 30, such as tricot or a woven fabric, which covers the surfaces of the former components. The seat frame 82 is fastened via brackets 22 to adjusting rails 20, which are disposed on an underbody, by means of bolts (not shown) and nuts 18. (Description and illustration of the seat back portions are omitted).

In order for the seat back reclining adjustment, the seat cushion front-and-back position adjustment and the like to be effected independently for the driver's seat portion and the front passenger seat portion, a total of four reclining lower arms 26 are necessary, one being provided respectively at left and right sides of each seat portion. The position of the reclining lower arm 26 is determined by the position of the seat back, and the reclining lower arms 26 must be positioned at the rear side of the seat frames 82. As a result, the portions of the seat frames 82, which correspond to the reclining lower arms 26 located at central sides in the transverse direction of the vehicle, protrude toward the rear. If the seat frames 82 are not protruded in this way, the rear side of the seat frames are divided at the reclining lower arm 26 portions, and strength of the seat frames 82 cannot be ensured. Therefore, it is difficult to provide a design in which strength is ensured without portions of the seat frames 82 protruding toward the rear.

SUMMARY OF THE INVENTION

With the aforementioned in view, an object of the present invention is to ensure the strength of seat frames without portions of the seat frames, which correspond to reclining lower arms provided at central sides in the transverse direction of the vehicle, being protruded toward the rear, by supporting the seat frame at both sides of the reclining lower arm.

The present invention is a seat frame-mounting structure including adjusting rails mounted to an underbody of a vehicle and provided respectively for a left seat and a right seat of a split bench seat to enable the left seat and the right seat to slide independently in longitudinal directions of the vehicle, reclining lower arms mounted respectively to the adjusting rails and provided so as to be erect at respective rear seat sides of the adjusting rails, and seat frames provided so as to correspond to the left seat and the right seat, and supported on the adjusting rails. Each of said seat frames has a cove-shaped cut-out which is open toward a rear of the vehicle to avoid interfering with the reclining lower arms, and edge portions of the cut-outs positioned at both sides of the reclining lower arms are supported by the adjusting rails.

In the seat frame-mounting structure with the above-described construction, left and right edge portions of a cut-out portion formed in a rear end portion, on the rear seat side, of the seat frame are supported by an adjusting rail. Accordingly, the strength of the seat frame can be ensured even if there is no protruding portion of the seat frame provided integrally with the rear side of the reclining lower arm.

DESCRIPTION OF THE PREFERRED EMBODIMENT

Figure 1:
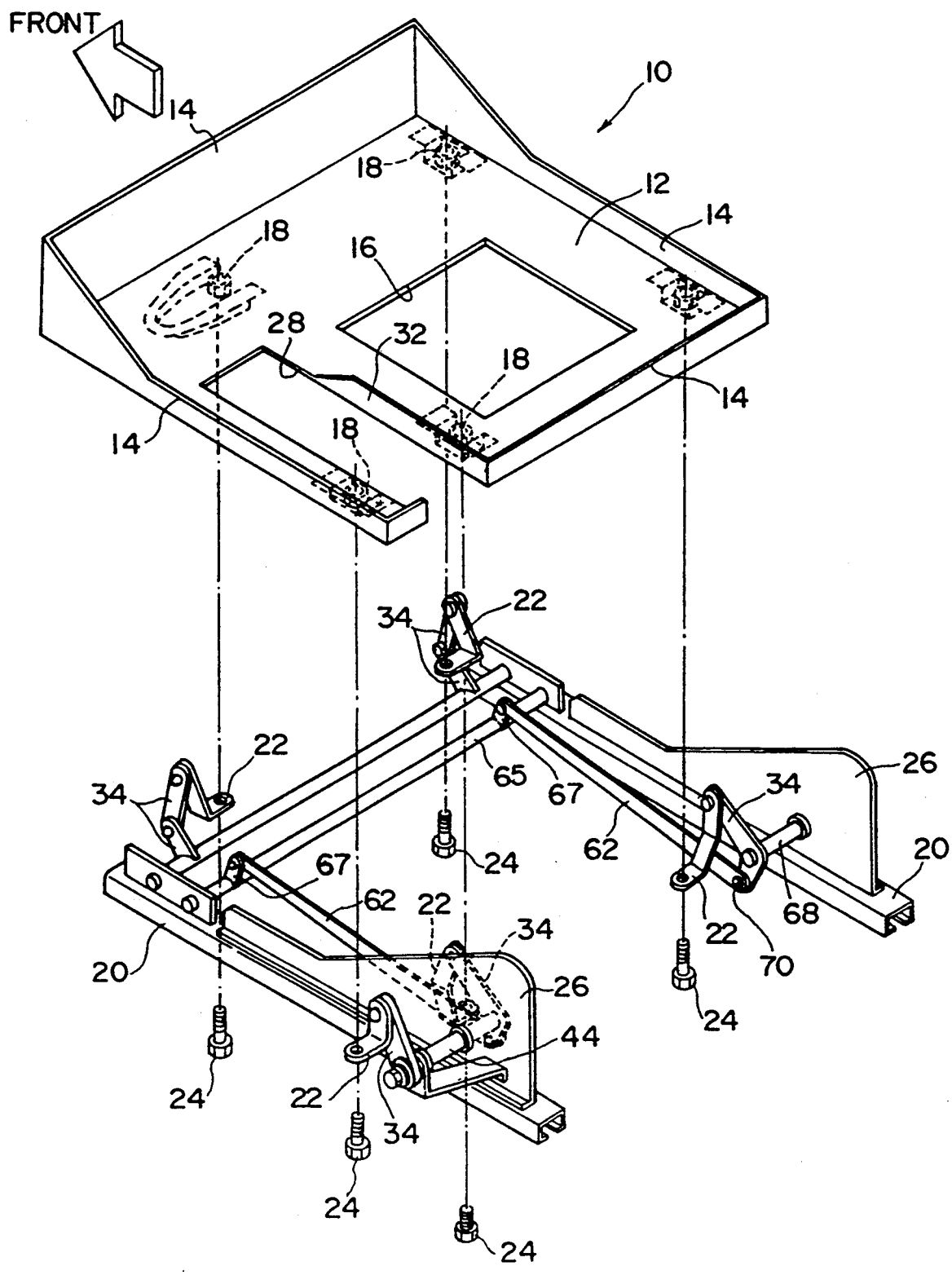
FIG. 1 is an exploded view showing a seat frame-mounting structure according to the present invention.

Referring to FIG. 1, a seat frame 10 according to the present invention is formed of: a plate member 12 having a substantially rectangular shape; and, reinforcing flanges 14 being bent at right angles from the outer periphery of the plate member 12, and of varying heights. An opening 16 for cushion springs (not shown) to be mounted therein is formed at a substantially central portion of the plate member 12.

Figure 2:
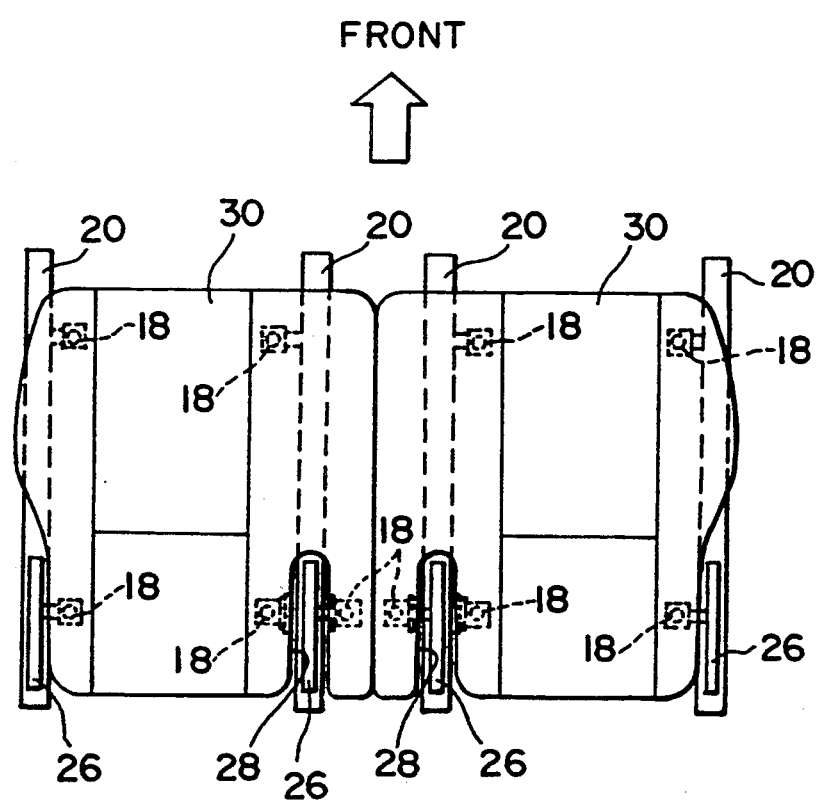
FIG. 2 is a plan view illustrating the seat frame-mounting structure.
Figure 4:
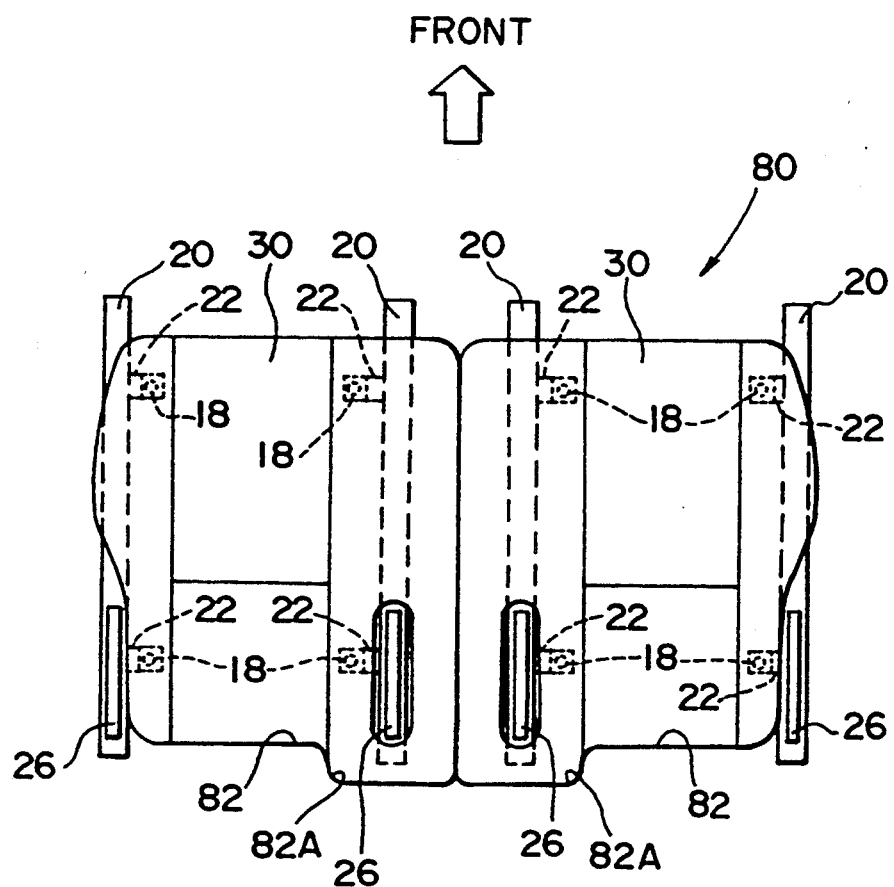
FIG. 4 is a plan view showing a conventional seat frame-mounting structure.

A total of five through-holes (not shown) are formed in the corners of the periphery of the plate member 12 for the seat frame 10, with nuts 18 anchored to the concentric planes of the through-holes. The seat frame 10 can thereby be fastened to adjusting rails 20 by means of bolts 24 via tightening brackets 22 which are provided on the adjusting rails 20. A fan-shaped reclining lower arm 26 is provided upright on each of the adjusting rails 20. At a portion of the plate member 12 corresponding to the reclining lower arms 26, a substantially rectangular cut-out portion 28, of which an edge portion behind a front vehicle seat is removed, is formed in the longitudinal direction of the adjusting rail 20 so as to surround the reclining lower arm 26. Thus, as shown in FIGS. 1 and 2, the end portions of the seat frames 10 behind the vehicle seat are thereby formed into a substantially straight line, with a covering material 30 extending around each set frame 10. Therefore, there is no need for the above-noted end portions to project backwards in order to avoid interfering with the reclining lower arm 26. (See FIG. 4) As illustrated in FIG. 1, the nuts 18 are also disposed at opposite edge portions of the cut-out portion 28 in the transverse direction of a vehicle. A reinforcing flange 32 is then provided upright on the right edge portion of the cut-out portion 28.

As seen from FIG. 1, the substantially L-shaped tightening brackets 22 are disposed at both front corners of the seat frame 10 in the longitudinal direction of the vehicle so as to fasten the seat frame 10 to the adjusting rails 20. Ones of the ends of the tightening brackets 22 are mounted to the adjusting rails 20 via linking members 34 in such a way that the tightening brackets 22 can rotate freely.

Figure 3:
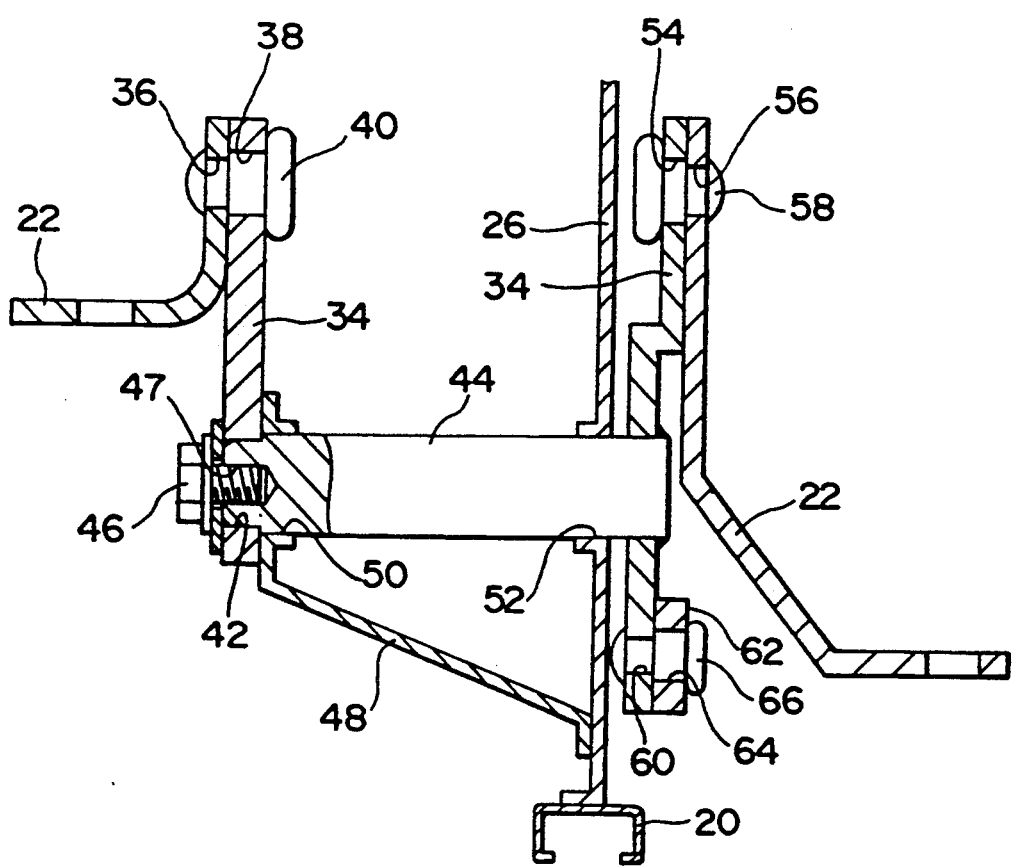
FIG. 3 is a cross-sectional view taken along a vertical plane as seen from a rear seat, showing the seat frame-mounting structure.

Referring to FIG. 3, a through-hole 36 is formed at an upper end portion of the substantially L-shaped tightening bracket 22 (at the left in FIG. 3). The tightening bracket 22 is bolted to the nut 18, which is provided at the left edge portion of the cut-out portion 28 formed in the seat frame 10. A pin 40 is inserted into the through-hole 36 and a through-hole 38 that is formed at an upper end portion of a linking member 34 (at the left in FIG. 3) which is disposed in parallel with the reclining lower arm 26. The tightening bracket 22 is thereby supported to the linking member 34 such that the tightening bracket 22 can rotate freely. At a lower end portion of the linking member 34, a through-hole 42 is formed, into which the left end portion of a shaft 44 is inserted. In a surface of the left end portion of the shaft 44, a mounting hole 47 is formed to allow a fixing bolt 46 to be engaged therein. While the linking member 34 is pivoted on an axis of the shaft 44 so as to position the linking member 34, the fixing bolt 46 is tightened into the mounting hole 47 of the shaft 44. The linking member 34 and the shaft 44 are thereby secured together, so that torque from the shaft 44 is transmitted to the linking member 34. The shaft 44 is rotatably supported by carrying holes 50 and 52, which are provided respectively in the vicinities of both end portions of the shaft 44. The carrying hole 50 is formed at one end of a stay 48, of which the other end is fixed to the reclining lower arm 26. The carrying hole 52 is formed in the reclining lower arm 26. The rightmost end portion of the shaft 44 is welded to a substantially central portion of another linking member 34 at the right in FIG. 3, which is also disposed in parallel with the reclining lower arm 26. A through-hole 54 is formed in an upper end portion of the above-noted linking member 34. A pin 58 is inserted through the through-hole 54 and a circular hole 56 that is formed in the tightening bracket 22 at the right in FIG. 3. This tightening bracket 22 is thereby supported to the linking member 34 so as to permit free rotation of the tightening bracket 22. As illustrated in FIG. 1, the tightening bracket 22 at the right in FIG. 3 is fastened to the seat frame 10 by means of a bolt 24 and a nut 18, the latter being disposed at the right edge portion of the cut-out portion 28. Again referring to FIG. 3, a circular hole 60 is formed at a lower end portion of the linking member 34 at the right in FIG. 3. A pin 66 is inserted through the circular hole 60 and a through-hole 64 which is formed in one end of a connecting rod 62 (See FIG. 1 for the connecting rods 62.). The linking member 34 is thereby connected to the connecting rod 62 so as to permit free rotation of the linking member 34. The other end of the connecting rod 62 shown in FIG. 1 is connected via a linking member 67 to a rod 65 that spans between the adjusting rails 20. The rod 65 is revolved by a driving source (not shown) such as a motor and the like so as to move the connecting rods 62 in the longitudinal direction of the vehicle. In addition, the tightening bracket 22, which is disposed toward the rear of the vehicle at the right in FIG. 1, is rotatably supported to a linking member 34. The linking member 34 is rotatably supported at a central portion thereof by a shaft 68 which is fixed to the reclining lower arm 26 at the right in FIG. 1. A lower end portion of the linking member 34 is connected by a pin 70 to one end of the connecting rod 62 at the right in FIG. 1. The other end of the above connecting rod 62 is also connected via a linking member 67 to the rod 65 that spans between the adjusting rails 20.

Next, a mounted state of the seat frame-mounting structure according to the present invention will be described.

As can be seen from FIG. 2, in each of the seat frames 10, the substantially rectangular cut-out portion 28 is formed behind the vehicle seat so as to avoid interfering with the reclining lower arm 26. Therefore, there is no need for a curved portion to be provided behind the vehicle seat. With this structure, a substantially straight line is now formed. As a result, this configuration provides a more favorable appearance, when viewed from a rear seat, and a wider space for the legs of occupants seated in the rear of the vehicle.

In addition, referring to FIGS. 1 and 2, on the adjusting rail 20, which is disposed at a central portion of each of the seat frames 10 in the transverse direction of the vehicle, the following components are successively mounted so as to secure the seat frame 10 to the adjusting rail 20: the reclining lower arm 26, which is directly mounted on the adjusting rail 20; the shaft 44, which is rotatably supported by the reclining lower arm 26; the linking members 34, which are fixed to both end portions of the shaft 44; and, the tightening brackets 22, which are supported by the linking members 34. With this structure, the seat frame 10 is fastened to the adjusting rail 20 at two points which are located at both sides of the reclining lower arm 26 in the transverse direction of the vehicle. Consequently, the seat frame 10 is rigidly secured thereto without movement.

Furthermore, when the rod 65 is revolved by the driving source, such as a motor, so as to move the connecting rods 62 in the longitudinal direction of the vehicle, the linking member 34 at the right of FIG. 3 pivots on the shaft 44. This pivoting force then urges the other linking member 34 at the left in FIG. 3 to pivot via the shaft 44. At this time, although supported by the linking members 34 to allow free rotation, both of the tightening brackets 22, which are positioned respectively at both sides of the reclining lower arm 26, are moved in the vertical direction because the seat frame 10 prevents a complete turn. A driving force from the connecting rod 62 in the longitudinal direction of the vehicle is thereby transformed into a driving force in the vertical direction to move the seat frame 10 in vertical directions.

Because the seat frame-mounting structure according to the present invention is constructed as described above, the rear end portion of the seat frame does not protrude at the reclining lower arm portion toward the rear seat. Therefore, there is a desirable appearance when seen from the rear seat, and a wider space for the legs of occupants in the rear seat of the vehicle is ensured. In addition, the seat frame can be made lighter in the absence of the curved portion and can conveniently be covered with a covering material, thereby allowing for less cost and fewer operating components.

What is claimed is:

1. A seat frame-mounting structure comprising:
   adjusting rails mounted to an underbody of a vehicle and provided respectively for a left seat and a right seat of a split bench seat to enable said left seat and said right seat to slide independently in longitudinal directions of the vehicle;

reclining lower arms mounted respectively to said adjusting rails and provided so as to be erect at respective rear seat sides of said adjusting rails; and seat frames provided so as to correspond to said left seat and said right seat, and supported on said adjusting rails;

wherein each of said seat frames has a cove-shaped cut-out which is open toward a rear of the vehicle to avoid interfering with said reclining lower arms, and edge portions of said cut-outs positioned at both sides of said reclining lower arms are supported by said adjusting rails.

2. A seat frame-mounting structure according to claim 1, wherein each of said seat frames is supported by two of said adjusting rails.

3. A seat frame-mounting structure according to claim 2, wherein said cut-out is cut out in a substantially rectangular form.

4. A seat frame-mounting structure according to claim 2, wherein each of said seat frames is shaped so as to avoid interfering with said reclining lower arms, and each of said seat frames has said cut-out open toward the rear of the vehicle at a vicinity of a central portion in a transverse direction of the vehicle.

5. A seat frame-mounting structure according to claim 4, wherein said cut-out is cut out in a substantially rectangular form.

6. A seat frame-mounting structure according to claim 4, further comprising:

connecting means axially supported by said reclining lower arm and connecting said seat frame to said adjusting rail via said reclining lower arm.

7. A seat frame-mounting structure according to claim 6, wherein said cut-out is cut out in a substantially rectangular form.

8. A seat frame-mounting structure according to claim 6, wherein each of said connecting means have a shaft member and a linking member, said shaft member being axially supported by said reclining lower arm, and said linking member being mounted to an end portion of said shaft member so as to adjust a vertical position of said split bench seat.

9. A seat frame-mounting structure according to claim 8, wherein said cut-out is cut out in a substantially rectangular form.

10. A seat frame-mounting structure according to claim 8, wherein said linking member has a bracket member axially supported in a vicinity of an end portion thereof so as to be rotatable, one end of said bracket member being fixed to one of said seat frames.

11. A seat frame-mounting structure according to claim 10, wherein said cut-out is cut out in a substantially rectangular form.

12. A seat frame-mounting structure according to claim 10, wherein the edge portions of said cut-outs positioned at both sides of said reclining lower arms are supported by two of said bracket members, each of said edge portions being supported respectively by one of said bracket members, and said bracket members being provided respectively at both sides of said reclining lower arm, and said two of said bracket members are connected respectively to each side of one of said shaft members via said linking members which correspond respectively to said two of said bracket members.

13. A seat frame-mounting structure according to claim 12, wherein said cut-out is cut out in a substantially rectangular form.

14. A seat frame-mounting structure according to claim 12, wherein said linking member which is connected to a bracket member, among said two of said bracket members, provided on an inner side of said seat frame in a transverse direction of said seat frame, is fixed to said shaft member so as to be able to be positioned in a direction of rotation around an axis of said shaft member.

15. A seat frame-mounting structure according to claim 14, wherein said cut-out is cut out in a substantially rectangular form.

16. A seat frame-mounting structure according to claim 14, wherein said reclining lower arm has a stay, one end of said stay being fixed to said reclining lower arm, and another end of said stay axially supporting a vicinity of one end of said shaft member.

17. A seat frame-mounting structure according to claim 16, wherein said cut-out is cut out in a substantially rectangular form.

18. A seat frame-mounting structure according to claim 1, wherein said split bench seat is divided in two at a central portion in the transverse direction of the vehicle.

19. A seat frame-mounting structure according to claim 18, wherein said cut-out is cut out in a substantially rectangular form.

20. A seat frame-mounting structure according to claim 1, wherein said cut-out is cut out in a substantially rectangular form.

21. A seat frame-mounting structure comprising:

adjusting rails mounted to an underbody of a vehicle, two of said adjusting rails being provided for each portion of a split bench seat, which is divided into two portions at a central portion in a transverse direction of the vehicle, to enable said portions of said split bench seat to slide independently in longitudinal directions of the vehicle;

reclining lower arms mounted respectively to said adjusting rails and fixed to respective rear seat sides of said adjusting rails; and seat frames provided so as to correspond respectively to said portions of said split bench seat, and supported on said reclining lower arms;

wherein each of said seat frames is shaped so as to avoid interfering with said reclining lower arms, and has a cove-shaped cut-out, in a vicinity of a central portion in the transverse direction of the vehicle, which is open toward a rear of the vehicle, and edge portions of said cut-outs positioned at both sides of said reclining lower arms are supported by said reclining lower arms.

22. A seat frame-mounting structure according to claim 21, further comprising:

a shaft member axially supported by said reclining lower arm;

a linking member mounted to an end portion of said shaft member; and a bracket member having a substantial L-shape and being axially supported so as to be rotatable in a vicinity of one end portion of said linking member, one end of said bracket member being fixed to said seat frame.

23. A seat frame-mounting structure according to claim 22, wherein said cut-out is cut out in a substantially rectangular form.

24. A seat frame-mounting structure according to claim 22, wherein the edge portions of said cut-outs positioned at both sides of said reclining lower arms are supported by two of said bracket members, each of said edge portions being supported respectively by one of said bracket members, and said bracket members being provided respectively at both sides of said reclining lower arm.

25. A seat frame-mounting structure according to claim 24, wherein said cut-out is cut out in a substantially rectangular form.

26. A seat frame-mounting structure according to claim 24, wherein said two of said bracket members are connected to one of said shaft members via said linking members which correspond respectively to said two of said bracket members.

27. A seat frame-mounting structure according to claim 26, wherein said cut-out is cut out in a substantially rectangular form.

28. A seat frame-mounting structure according to claim 26, wherein said linking member provided at one end of said shaft member is fastened by a bolt to said shaft member so as to be able to be positioned in a direction of rotation around an axis of said shaft member.

29. A seat frame-mounting structure according to claim 28, wherein said cut-out is cut out in a substantially rectangular form.

30. A seat frame-mounting structure according to claim 28, wherein said reclining lower arm has a stay, one end of said stay being fixed to said reclining lower arm, and another end of said stay having a supporting hole, said supporting hole axially supporting a vicinity of an end of said shaft member.

31. A seat frame-mounting structure according to claim 30, wherein said cut-out is cut out in a substantially rectangular form.

32. A seat frame-mounting structure according to claim 21, wherein said reclining lower arm is provided such that as said reclining lower arm becomes distant from said adjusting rail in a vertical direction of the vehicle, a width of said reclining lower arm in a longitudinal direction of the vehicle becomes smaller.

33. A seat frame-mounting structure according to claim 32, wherein said cut-out is cut out in a substantially rectangular form.

34. A seat frame-mounting structure according to claim 21, wherein said cut-out is cut out in a substantially rectangular form.

* * * * *